No. 885,842. PATENTED APR. 28, 1908.
S. ELLIOTT.
TURN TABLE.
APPLICATION FILED JULY 5, 1907. RENEWED MAR. 11, 1908.

2 SHEETS—SHEET 1.

Witnesses:
H. B. Davis,
H. A. Boyle.

Inventor;
Sterling Elliott.
By Noyes & Harriman,
Attys.

No. 885,842. PATENTED APR. 28, 1908.
S. ELLIOTT.
TURN TABLE.
APPLICATION FILED JULY 5, 1907. RENEWED MAR. 11, 1908.

2 SHEETS—SHEET 2.

Witnesses:
H. B. Davis.
H. A. Boyle.

Inventor:
Sterling Elliott,
by Noyes & Harriman
attys.

UNITED STATES PATENT OFFICE.

STERLING ELLIOTT, OF NEWTON, MASSACHUSETTS.

TURN-TABLE.

No. 885,842.  Specification of Letters Patent.  Patented April 28, 1908.

Application filed July 5, 1907, Serial No. 382,140.  Renewed March 11, 1908.  Serial No. 420,455.

*To all whom it may concern:*

Be it known that I, STERLING ELLIOTT, of Newton, county of Middlesex, State of Massachusetts, have invented an Improvement in Turn-Tables, of which the following description, in connection with the accompanying drawings, is a specification, like characters on the drawings representing like parts.

This invention relates to turn-tables, especially designed for use in a garage for turning automobiles, yet it may be put to other uses.

The invention has for its object to construct a turn-table which is truly circular and is so constructed and arranged as to remain truly circular under all ordinary conditions even when subjected to severe strains, also to run true and turn free, is fire-proof, and is self-contained, requires no oil and will carry the heaviest cars, the construction being such that it may be built economically yet in the very best possible manner to withstand the rough usage and heavy strain to which it is subjected.

Figure 1:
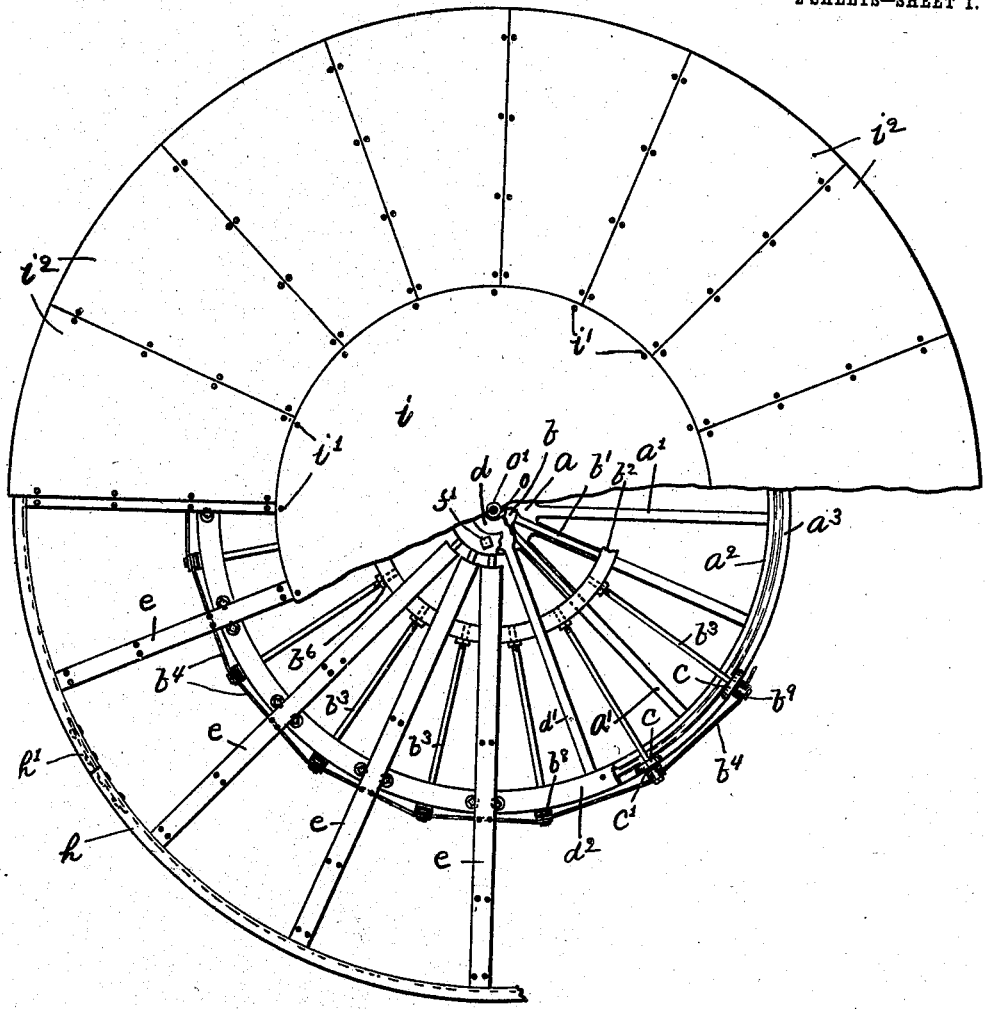
Figure 2:
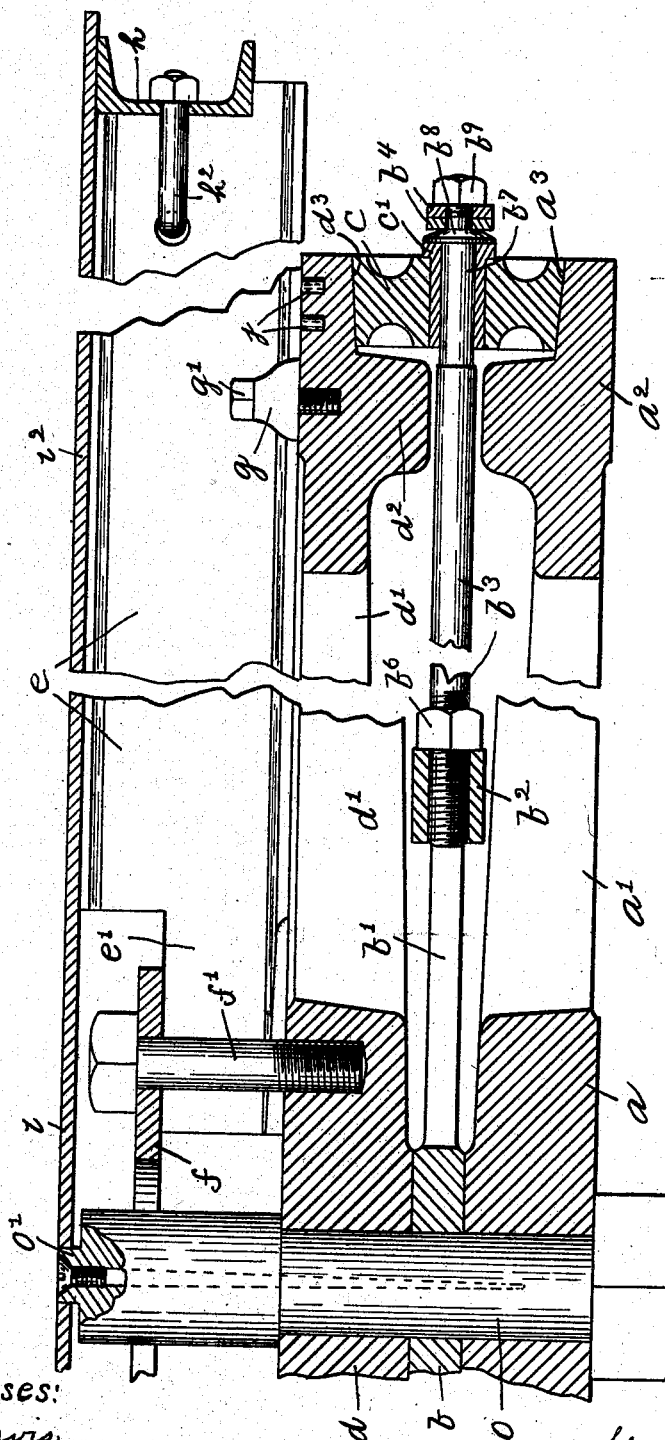

Figure 1 shows in plan view a turn-table embodying this invention, part of the platform being removed to expose the parts beneath it. Fig. 2 is an enlarged vertical section of the turn-table shown in Fig. 1, the parts being broken away to save space on the drawing.

The stationarily supported bed-casting is made circular, and, as herein shown, is composed of a single piece of metal, and comprises a hub $a$ having a hole through it for the king-bolt $o$, a plurality of spokes $a'$ extending radially from said hub and a circular rim $a^2$ at the extremities of said spokes. The rim $a^2$ has formed on its upper side preferably at its outer edge, a track $a^3$ which is adapted to receive upon it anti-friction rollers. This circular track $a^3$ gradually declines from its inner to its outer edge. This bed-casting may be otherwise constructed without departing from my invention, but the provision of a circular track $a^3$, declining from its inner to its outer edge is quite important.

Above the bed-casting a roller-supporting frame is located. This frame, as herein shown, comprises a hub $b$ having a hole through it for the king-bolt $o$, spokes $b'$ extending radially from said hub, a circular rim $b^2$ at the extremities of said spokes, a plurality of shafts $b^3$ extending outwardly, in a radial direction from said rim $b^2$, which are adjustably connected with said rim, and spacing bars $b^4$, at the outer ends of said shafts which act to hold the shafts in predetermined relative positions. The hub $b$ and spokes $b'$ and rim $b^2$ are herein shown as cast in a single piece. The inner ends of the shafts $b^3$ are screw-threaded and enter or extend through threaded holes in the rim $b^2$, check-nuts $b^6$ being placed on said screw-threaded portions of the shafts which bear against said rim. The shafts $b^3$, near their extremities, are or may be reduced in diameter and formed cylindrically to provide a bearing portion $b^7$ on which the anti-friction rollers $c$ are placed. These rollers have oil-less or other bushings $c'$. The anti-friction rollers $c$ are made conical, the angle of their contact faces corresponding to the angle of the declining track $a^3$, on which they are designed and intended to run. A spacing-bar $b^4$, is provided for each space between the shaft $b^3$, and they are made long enough to extend across such space and to engage the shafts, and each bar is provided with a slot at each end to receive the ends of the shafts. When the spacing bars are placed in position on the shafts, the ends thereof overlap each other. Washers $b^8$ are or may be interposed between the overlapped ends of the spacing-bars and the bushings, and nuts $b^9$ are turned on the screw-threaded ends of the shafts, which bear against the spacing-bars.

The anti-friction rollers may be adjusted toward and from the axis on which the roller-supporting frame revolves by turning the shafts $b^3$ in the rim $b^2$. The roller-supporting frame may be otherwise constructed without departing from my invention, but provision for radial adjustment of the roller-supporting shafts is quite important, and the employment of a center-frame of large diameter to which the roller-supporting shafts are connected is very desirable, as by its use short roller-supporting shafts may be employed, very much shorter than would be the case if a hub of small diameter was employed in lieu of a center frame of large diameter. Upon the roller-supporting frame the platform-supporting frame is located. This frame, as herein shown, consists of a single piece casting and comprises a hub $d$ having a hole through it for the king-bolt $o$, spokes $d'$ and the rim $d^2$. It is made substantially like the bed-casting and of the same diameter but is inverted. A track $d^3$ is formed on the under side of the rim $d^2$, preferably at its outer edge, which rests upon the conical anti-friction rollers $c$, and said track is inclined from its inner edge to its outer edge, the angle of inclination corresponding to the angle of the contact face of the anti-friction rollers. The angles of the two tracks $a^3$ and $b^3$ and of the contact faces of the anti-friction rollers are such that straight lines extending from the points of contact between the rollers and tracks, in a direction toward the center of the turn-table, will cross each other at the center of the turn-table. This platform-supporting frame may be otherwise constructed without departing from my invention but the provision of a circular track $d^3$, inclining from its inner to its outer edge is quite important.

The platform-supporting frame is designed to be freely rotatable on the king-bolt and so also is the roller-supporting frame, and by providing conical anti-friction rollers and tracks on the bed-casting and platform-supporting frame corresponding to the angles of the contact faces of said rollers, the grinding action incidental to the employment of cylindrical rollers is avoided.

Mounted on the platform-supporting frame are a plurality of I-beams $e$, which extend radially from at or near the king-bolt $o$ to and preferably beyond the outer edge of the rim $d^2$. The inner ends of said I-beams $e$ are cut away at their upper sides and the reduced end portions $e'$, formed by thus cutting away the beams, are fitted under a ring $f$. The ring $f$ encircles the king-bolt $o$ and is drawn down firmly upon the reduced ends of the I-beams by bolts $f'$ which pass through holes in said ring and enter holes in the hub $d$ of the platform-supporting frame, said bolts being located between the I-beams. The inner ends of the I-beams are thus firmly connected with the hub of the platform-supporting frame.

The outer ends of the I-beams, which rest upon the rim $d^2$, are connected to said rim by clamping-collars $g$, located at opposite sides of the beams and overlying the feet thereof, said collars being secured to the rim by bolts $g'$ passing through the collars and into the rim. The outer ends of the I-beams are connected together by a ring $h$ of channel steel, which, as herein shown, is made of four pieces arranged with their ends abutted together and connected by fish plates $h'$ bolted to the ring. The ring $h$ is also connected to the extremities of each I-beam by a hook bolt $h^2$ extending through the ring and through a hole in the web of the I-beam or by other suitable means. The outer ends of the I-beams are cut away to form a recess to receive said channeled steel ring $h$ and to provide a shoulder on which said ring rests.

The several I-beams are arranged to occupy a horizontal plane, and the top of the channel ring $h$ is flush with the tops of the I-beams. The I-beams serve as a support for the platform or flooring, but I do not desire to limit my invention to the particular construction of support thus provided, although radially disposed bars connected at both ends to the platform-supporting frame form a very efficient support. The I-beams may be provided with dowels $j$ which enter holes in the rim $d^2$. The platform or flooring comprises a central circular plate $i$, preferably of steel, bored at the center to fit upon the reduced end portion $o'$ of the king-bolt $o$ and having its circumference turned in a lathe exactly round and concentric with the center hole. The plate $i$ is held in place by screws $i'$ extending through it and into the tops of the I-beams. The platform also comprises a plurality of sections $i^2$ of steel plate arranged around the plate $i$ and secured to the I-beams by screws or otherwise. These sections $i^2$ are all made alike and are arranged side by side, circularly about the center plate, and occupy the same plane, and the inner ends thereof are made to abut against the edge of the center plate.

Having thus described my invention, what I claim as new and desire to secure by Letters Patent is:—

1. In a turn-table, the combination of a bed-casting having a circular track, a rotatable platform-supporting frame also having a circular track, an interposed rotatable roller-supporting frame having a plurality of longitudinally adjustable radially disposed shafts, and an anti-friction roller on each shaft which engages said tracks, substantially as described.

2. In a turn-table, the combination of a bed-casting having a circular track, a rotatable-platform-supporting frame also having a circular track, and an interposed roller-supporting frame comprising a hub and a circular rim, and means for connecting said hub and rim, a plurality of roller-supporting shafts extending radially from said rim bearing anti-friction rollers at their extremities which engage said tracks, substantially as described.

3. In a turn-table, the combination of a bed-casting having a circular track, a rotatable platform-supporting frame also having a circular track, an interposed roller-supporting frame comprising a hub and a circular rim, and means for connecting said hub and rim, and a plurality of shafts adjustably connected with said rim, extending radially therefrom, and anti-friction rollers borne by said shafts which engage said tracks, substantially as described.

4. In a turn-table, the combination with a bed-casting having a circular track, a rotatable platform-supporting frame also having a circular track, an interposed rotatable roller-supporting frame having a plurality of radially extended shafts bearing anti-friction rollers, which engage said tracks, and spacing-bars connecting the outer ends of said shafts together, substantially as described.

5. In a turn-table, the combination of a bed-casting comprising a hub, radially extended spokes and a rim having a circular track on its upper side, a rotatable platform-supporting frame comprising a hub, radially extended spokes and a rim having a circular track upon its under side, an interposed rotatable roller-supporting frame having radially extended shafts, each bearing at its extremity an anti-friction roller which engages said tracks, and spacing-bars connected to the extremities of said shafts, substantially as described.

6. In a turn-table, a rotatable supporting-frame, a plurality of radially disposed beams on said supporting-frame, means for connecting the inner ends of said beams to said supporting-frame and means for connecting the outer ends of said beams to said supporting-frame, means for connecting the outer ends of said beams together and a platform on said beams, substantially as described.

7. In a turn-table, a rotatable platform-supporting frame, a plurality of radially disposed I-beams secured to said supporting-frame, means for connecting the outer ends of said I-beams together and a platform secured to the flat tops of said I-beams, substantially as described.

8. In a turn-table, a rotatable platform-supporting frame comprising a hub, spokes and rim, a plurality of radially disposed beams on said supporting-frame connected at their inner ends to said hub and at their outer ends to said rim, means for connecting the outer ends of said beams together and the platform on said beams, substantially as described.

9. In a turn-table, a rotatable platform-supporting-frame, a plurality of I-beams radially disposed on said supporting-frame cut away at their inner ends, a circular plate overlying the reduced ends of said beams, and means for connecting said plate with the supporting-frame, and a platform on said beams, substantially as described.

10. In a turn-table, a rotatable platform-supporting-frame, a plurality of I-beams radially disposed on said supporting-frame, means for connecting the inner ends of said beams to said supporting-frame, and clamps overlying the feet of said beams for connecting said beams with the supporting-frame, and a platform on said beams, substantially as described.

11. In a turn-table, a rotatable platform-supporting-frame, a plurality of I-beams radially disposed on said supporting-frame cut away at their outer ends, means for connecting the inner ends of said beams with the supporting-frame, a channel ring set in said cut away portions of the beams, means for connecting said ring with each beam, and a platform on said beams, substantially as described.

12. In a turn-table, a rotatable supporting-frame, a plurality of I-beams radially disposed on said supporting-frame cut away at their outer ends to provide shoulders, a channel-ring at the outer ends of said beams which rest on said shoulders, means for connecting said ring with each beam, and a platform on said beams, substantially as described.

13. In a turn-table, a rotatable supporting-frame, a plurality of I-beams radially disposed on said supporting-frame which are connected to the heel and rim of said supporting-frame, a channel-ring at the outer ends of said beams composed of a plurality of sections, means for connecting the sections of said ring together, means for connecting the ring to the ends of said beams, and a platform on said beams, substantially as described.

14. In a turn-table, a rotatable platform-supporting-frame, a plurality of radially disposed I-beams connected to the heel and rim of said supporting-frame, a channel-ring at the outer ends of said beams, hook bolts extended through said ring and through the webs of the beams for connecting said ring with the beams, and a platform on said beams, substantially as described.

In testimony whereof, I have signed my name to this specification, in the presence of two subscribing witnesses.

STERLING ELLIOTT.

Witnesses:
  B. J. NOYES,
  H. B. DAVIS.